United States Patent
Wilson et al.

(10) Patent No.: US 10,430,439 B1
(45) Date of Patent: Oct. 1, 2019

(54) MEMBER ACTIVITY ACROSS CHANNELS

(71) Applicant: United Services Automobile Association (USAA), San Antonio, TX (US)

(72) Inventors: Keith Wilson, San Antonio, TX (US); Michelle Serry, Universal City, TX (US); Larry W. Clark, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 758 days.

(21) Appl. No.: 14/684,961

(22) Filed: Apr. 13, 2015

Related U.S. Application Data

(60) Provisional application No. 61/978,432, filed on Apr. 11, 2014.

(51) Int. Cl.
*G06F 16/28* (2019.01)
*G06F 16/248* (2019.01)

(52) U.S. Cl.
CPC .......... *G06F 16/283* (2019.01); *G06F 16/248* (2019.01)

(58) Field of Classification Search
CPC .................................................. G06F 16/283
USPC .................. 707/706, 723, 736, 758, 781
See application file for complete search history.

(56) References Cited

U.S. PATENT DOCUMENTS

| | | | |
|---|---|---|---|
| 2001/0029502 A1* | 10/2001 | Oeda ................. | G06F 17/30578 |
| 2008/0095355 A1 | 4/2008 | Mahalaha et al. | |
| 2011/0206198 A1 | 8/2011 | Freedman et al. | |
| 2012/0295601 A1* | 11/2012 | Lang ..................... | G06Q 10/10 |
| | | | 455/415 |
| 2014/0179260 A1* | 6/2014 | Malin ..................... | H04W 4/90 |
| | | | 455/404.2 |
| 2015/0032581 A1* | 1/2015 | Blackhurst ............. | G06Q 40/12 |
| | | | 705/30 |

* cited by examiner

*Primary Examiner* — Syling Yen
(74) *Attorney, Agent, or Firm* — Eric L. Sophir; Dentons US LLP

(57) ABSTRACT

A computing system of an organization receives data through multiple channels of communication; a programmatic interface for each of the different channel infrastructures may be called to convert data about a member's contact with the system. Contact records for contain data such as a member ID and a channel identifier. An operational database may receive the converted contact records from the devices or software. A transaction application may perform various tasks resulting in the generation of transaction data. A transaction record containing the transaction data may be generated in a message queue or operational database. The interface for the communication channel may convert the transaction data in a message queue, after the transaction data is detected by a listening application that monitors the message queue and logs new transaction data to the operational database.

20 Claims, 2 Drawing Sheets

MEMBER ACTIVITY ACROSS CHANNELS

CROSS-REFERENCE TO RELATED APPLICATIONS

This non-provisional application claims priority to U.S. Provisional Patent Application Ser. No. 61/978,432, entitled "SYSTEMS AND METHODS RELATING TO CALLER-CENTRIC CALL DATA," filed Apr. 11, 2014, which is incorporated by reference herein, in its entirety.

This application is related to co-pending U.S. patent application Ser. No. 14/684,897, entitled "SYSTEMS AND METHODS RELATING TO CALLER-CENTRIC CALL DATA," filed Apr. 13, 2015, which is incorporated by reference herein, in its entirety.

TECHNICAL FIELD

This application is generally related to data collection and analysis. This application is generally related to enterprises data management. This application is also generally related to database management.

BACKGROUND

Conventional call center technology and customer relationship management technology are often unable to provide call center representatives with a quick view into recent member activities on a customer facing system, where customer information and transactions are supplied across multiple communication channels. The data necessary to provide these functions is frequently generated and stored by disparate systems, where the data records needed for these features are often incompatible.

Conventional CRM and call center systems gather and process data to analyze customer information to provide a history how other prior representatives have helped a customer in the past. However, conventional systems may not be able to offer insight into what the member was doing through multiple communication channels, in real-time or near real-time. Moreover, conventional marketing tools merely cross-reference behavioral aspects of members against broad demographic grouping criteria to draw inferences about a member's particular behavior. But, such conventional tools are unable to identify marketing leads, in real-time or near-real time, based on a member's interactions with the systems, from across one or more of communication channels.

What is needed is a means of capturing information about multichannel communications and customer activities, which may be converted to a commonly understood format, and then stored for downstream applications to use for real-time multichannel understanding of customer activities, or data analysis.

SUMMARY

Described herein are exemplary system and method embodiments of technology addressing the shortcomings in the art described above, and may provide other advantages as well. As explained herein, a computing system of an organization may receive data or instructions from members of the organization, through multiple channels of communication. The system provides for a programmatic interface for each of the different channel infrastructures, which may be called to convert and capture data about a member's contact with the system. Contact records for each contact event may contain data such as a member ID or other user identifier, and a channel identifier to determine which interface to use. An operational database may receive the converted contact records, often in real-time or near real-time, from the devices or software. In many cases, the contact data is provided from the logging functions of the hardware or software devices of the channel or an authentication server. After the member is identified, and the member may trigger a transaction application to perform various tasks, which may result in the generation of transaction data. A transaction record containing the transaction data may be generated in a message queue or operational database. In some cases, the interface for the communication channel may convert the transaction data in a message queue, after the transaction data is detected by a listening application that monitors the message queue and logs new transaction data to the operational database. In addition, in order to provide the analytics data sources, such as an enterprise data warehouse, with the contact records and transaction records, an interface may writes the data to an archive.

In one embodiment, system comprises a representative computer associated with a call having a member identifier, the representative computer configured to query an operational database for one or more contact records associated with the member identifier, and format the contact records for presentation on a graphical user interface; a computer having an application program interface configured to receive contact data from at least one of a plurality of channels, format the contact data for storage as a contact record in the operational database, and transmit the formatted contact data to the operational database, wherein the contact data comprises the member identifier; and the operational database configured to generate contact records from contact data associated with each of the plurality of channels.

In another embodiment, a system comprises a marketing lead generation application hosted on one or more servers, the marketing lead generation application configured to identify a product or service to offer a member based on information contained in one or more data records stored in an enterprise data warehouse hosted on one or more servers; a representative computer associated with a call having a member identifier associated with the member, the representative computer configured to receive from the marketing generation application the product or service to offer the member, and present the product or service on a graphical user interface displayed by the representative computer; a computer having an application program interface configured to receive contact data from at least one of a plurality of channels, format the contact data for storage as a contact record in an operational database, and transmit the formatted contact data to the operational database, wherein the contact data comprises the member identifier; and the operational database configured to replicate one or more data records to the enterprise data warehouse at a predetermined interval, wherein at least one data record is the contact record.

DETAILED DESCRIPTION

Figure 1:
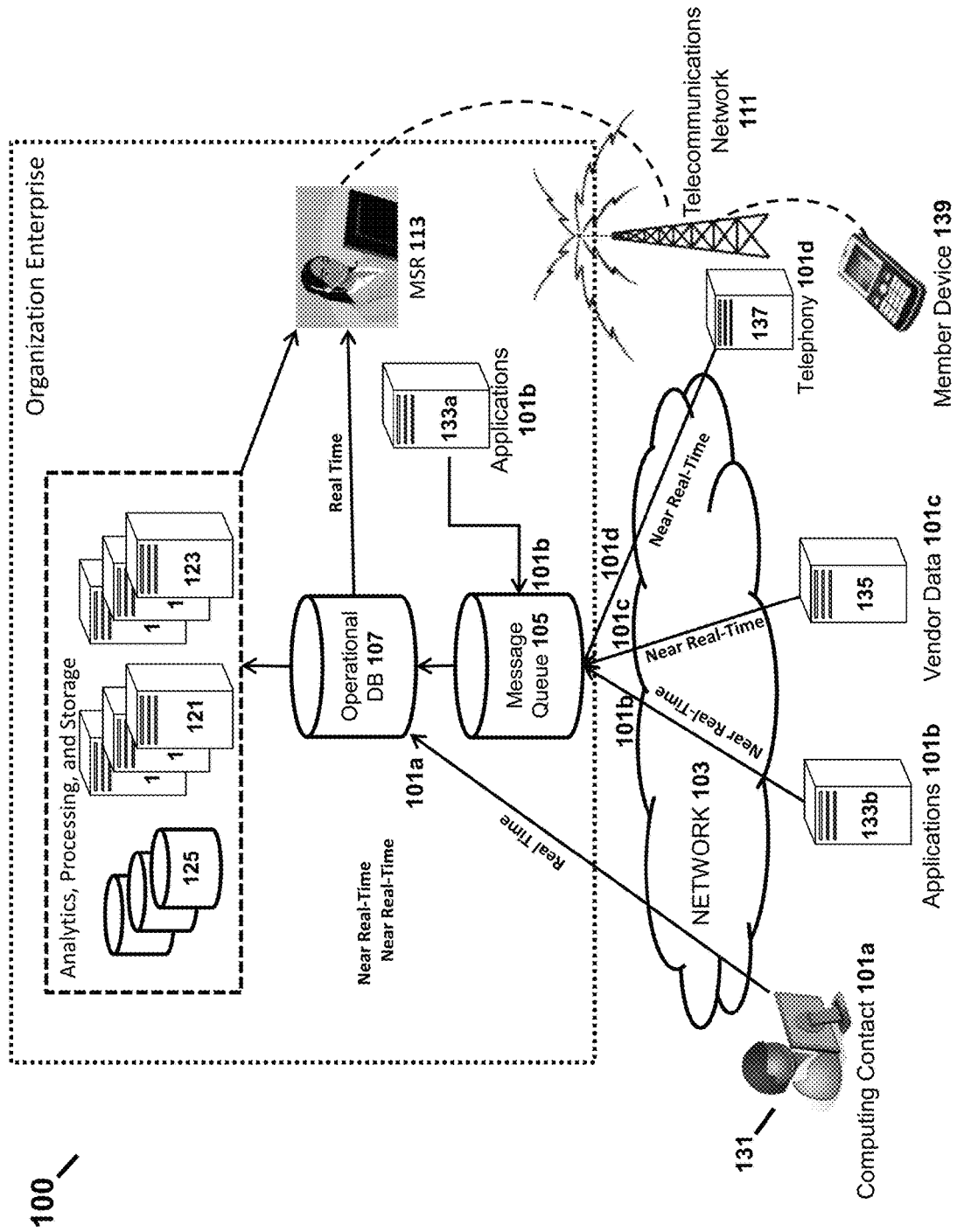
FIG. 1 shows an exemplary system for collecting and analyzing member data, according to an exemplary embodiment

The present disclosure is herein described in detail with reference to embodiments illustrated in the drawings, which form a part of this application. However, it should be appreciated that changes may be made to the embodiments described herein and additional or alternative embodiments may be implemented or used, without departing from the spirit or scope of the present disclosure. The illustrative embodiments described in the Detailed Description are not meant to be limiting of the subject matter described.

Reference will now be made to the exemplary embodiments illustrated in the drawings, and specific language will be used to describe the same. It will nevertheless be understood that no limitation of the scope of the invention is intended. Alterations and further modifications of the inventive features illustrated herein, and additional applications of the principles of the inventions as illustrated herein, which would occur to one skilled in the relevant art and having possession of this disclosure, are to be considered within the scope of the subject matter described.

Exemplary System Components

FIG. 1 shows an exemplary system 100 for collecting and analyzing member data, according to an exemplary embodiment. The exemplary system 100 may comprise communication channels 101, one or more networks 103, a member device 109, a message queue 105, an operational database 107, a member service representative (MSR) device 113, and backend enterprise computing services 121, 123, 125. In an exemplary operation, a member may interact with an organization's computing services or human MSRs through multiple channels 101. During these interactions, data associated with the contact session and data associated with transactions requested or performed by the member may be produced and stored into a message queue 105. When incoming is detected in the message queue 105, application programming interfaces (APIs) may convert the incoming data to a compatible format for an operational database 107, where the incoming data will be stored. Eventually, the incoming data may be provided to various computing devices of the organization, such as MSR devices 113 or various analytics, processing, and storage applications.

Members may be individuals, groups of people, business units, companies, or any other entity or collection of people, who are potential or existing, customers, clients, or subscribers, to products or services offered by the organization. The organization may be most any entity that offers products or services, and hosts an enterprise system having the system 100 for multichannel communication with members. Non-limiting examples of organizations may include: banks, insurance providers, software companies, retail companies, manufacturers, and professional services companies. Using the various communications channels 101, members may communicate data with the organization to perform various tasks associated with the organization; examples of tasks may include communicating with an MSR, transmitting information about themselves (e.g., updating a member profile, completing a form or questionnaire), submitting or otherwise registering a support request pertaining to a service or a product offered by the organization.

Communication Channels

Communication channels 101 may host data communications between the organization enterprise and members, where data communications may be any data transfer between devices capable of communicating data over a network 103. The communications channels 101 may be any collection of hardware systems and software applications that may host the data communications of each particular channel 101. Non-limiting examples of communications channels 101 may include a computer contact channel 101$a$, software application data 101$b$, vendor database records 101$c$, a telecommunications channel 101$d$, and enterprise applications 101$e$, among others. In the exemplary system 100, the communications channels 101 may be characterized by the nature of the data communications expected for each particular channel 101. For example, a telecommunications data channel 101$d$ may comprise hardware and software components configured to host data communications, such as interactive voice response (IVR) relays and inputs, or short message service (SMS) texts, which are transmitted to the organization enterprise from servers 137 that host components a telephony system. However, it should be understood that the communication channels 101 may be established based on any criteria for determining which hardware and software components should handle data communications received from disparate systems and engendered in different formats. As such, the communication channels 101 of the exemplary system 100 are merely intended as examples, and additional or alternative communication channels 101 may be included, to support the additional or alternative software applications and hardware devices that would be associated with those additional or alternative communication channels 101.

The communication channels 101 may comprise any number of hardware and software components that enable data communication through the respective channels 101. Hardware components may be devices that are capable of transmitting data to the organization enterprise and processing the data for communication (e.g., routers, switches, routing queues). The software components may be the programmatic code, software applications, or firmware instructions executed by the constituent hardware devices of the channel 101. As an example, in an exemplary computer contact channel 101$a$, members may use a member device 131 to access a website of the organization, to perform various tasks. In this example, the computer contact channel 101$a$ may comprise hardware devices such as a member computer 131, a network 103, an enterprise server hosting the webserver, and a message queue 105. The software components may include the browser of the member device 131, the various protocols executed by devices of the network 103 (e.g., routers, switches, firewalls), and the webserver software and scripting executed by the enterprise server hosting the website. Communication channels 101 may be configured to host data transmitted from a source device or software application that transmits the excepted data communication. As shown in FIG. 1, non-limiting examples of sources (i.e., hardware or software components that transmit data or instructions) associated with communication channels 101 may include: an enterprise application 127 hosted by an enterprise server (within the organization enterprise), a member computer 131, a software application 133 hosted on a server that may be internal or external to the enterprise, a vender system 135 that transmit real-time or batch data updates, a telephony system 137, mail, email, fax, video-telephony, digital chat, and face-to-face MSR interactions (i.e., onsite interactions with MSR at a local facility), among others.

Data transfers may be accomplished through one or more networks 103, which comprise hardware devices (e.g., routers, switches, firewalls) and software components configured to relay data communications between devices and applications associated with the communication channels 103. In some cases, a software or hardware component of the network 103 may be a component of one or more communications channels 101. For example, in an exemplary vendor data channel 101*c*, a vendor data system 135 may be configured to transmit batches of data to the enterprise organization to update records of an enterprise warehouse database 125. In this example, the vendor data system 135 may transmit the data batch to the organization enterprise, over one or more packet-switched networks 103, which means that networking devices such as the routers and switches of the network 103 are also component hardware devices of the vendor data channel 101*c*.

Contact records may be generated in response to receiving data communications through the communication channels 101. Contact records may indicate a party who initiated the contact (e.g., member, vendor, application), as well as other information related to the contact (e.g., time, date, communication channel 101). Contact records may be automatically generated when a data communication received through a communication channel 101, is detected in a message queue 105. In some cases, data communications received through a channel 101 contains transaction records or instructions indicating that a transaction process was or should be executed by a transaction application. In these cases, a transaction process record associated with a contact record may be generated. For example, a contact record may be generated when a member access a webpage of the enterprise. If the member leaves the website without any further action, then only the record of the contact is generated and stored. But if the member performs a task, such as transferring funds between personal accounts, then a transaction record may be generated and stored with, or within, the contact record. Contact records and transaction records may be generated as a result of receiving contact and transactions through the communication channels 101.

Computing Contact Channel and Member Device

A computing contact channel 101*a* may comprise a member device 131, one or more networks 103, and software components executed by the member device 131 that generate or otherwise provide data communications to the organization enterprise. A member device 131 may be any computing device that comprises non-transitory machine-readable storage memory and a processor capable of executing software applications that provide data communications to the organization enterprise. Non-limiting examples of the member device 131 may include a workstation computer, a laptop computer, a mobile phone, a tablet device, and the like.

In some embodiments, an enterprise may comprise a server hosting a webserver (not shown), which may be accessed by members to perform various tasks associated with the products or services provided by the organization. For example, if the organization is an insurance provider, the member may access the website to submit an application for an insurance product, using web-based application programmed for online application intake. In these embodiments, the webserver may be a component of a computing contact channel 101*a*. The webserver may host any number of web applications, which may support many techniques for gathering member information, such as member data submission or behavioral tracking of the member's actions. Each webpage of the website may be a graphical user interface (GUI) presented through a web browser on the member computer 131. The webpages may display any number of input options for instructing the web application to perform various processing tasks. When the member accesses the website, a contact record may be generated; and when the member provides some instructions to the web application, or some other transaction application of the enterprise, by interacting with the GUI controlling the application, the selected instructions are provided for the application to perform and a transaction data record is generated.

As mentioned, a contact record may be generated when a member accesses the website. However, in some embodiments, the enterprise may comprise a computing device, such as an authentication server (not shown), configured to manage authentication credentials assigned to parties who are granted access to secure components of the enterprise, and to execute authentication routines on behalf of other components of the enterprise when those components request support for authenticating individuals or devices seeking access rights. In such embodiments, a contact record may be generated when a member is authenticated from submitting valid credentials assigned to the member, during a challenge process associated with the particular communication channel 101.

Software Application Channel and Host Systems

A software application channel 101*b* may comprise a host server 133, one or more networks 103, and software components executed by the host server 133 that generate or otherwise provide data communications to the organization enterprise. In some cases, the software application channel 101*b* may comprise an enterprise host server 133*a* that is located within the logical computing boundaries of the organization enterprise. In some cases, the software application channel 101*b* may comprise an external host server 133*b*, which resides outside of the logical computing boundaries of the organization enterprise. A host server 133 may be any computing device comprising non-transitory machine-readable storage and a processor that is capable of performing the various tasks and processes described herein, such as executing processes and routines of a transactional software application ("transaction application") and transmitting the resulting transaction process data records ("transaction records") through one or more networks 103. Although the exemplary system 100 describes a transaction application being executed by a host server 133—i.e., a server computer—one skilled in the art could appreciate that the host server 133 may be any computing device comprising a processor that is capable of executing the routines of the transaction software. Non-limiting examples of host servers 133 providing transaction records through the software application channel 101*b* may include workstation computers, laptop computers, server computers, tablets, and the like. In some embodiments, multiple host servers 133 may be configured to execute the processes of the transactional application in a distributed computing system, such that multiple host servers 133 perform the routines of the transaction application.

Computing devices, such as host servers 133, may execute programmatic routines of a transaction application, which may output data of various types and formats. The host servers 133 may then transmit data communications containing the outputted data to the enterprise, after performing of the programmatic routines. In some cases, the outputted data may be the result of routines of an internal transaction application that is executed by a computing device of the enterprise, such as internal host server 133*a*. For example, where the organization is a bank, a transaction application for managing member accounts may include software routines for executing funds transfers between a member's accounts at the bank. In some cases, the transaction records may result from routines of external transaction applications that are executed by computing devices external to the enterprise, such as external host servers 133*b*.

The outputted data may be transaction data containing data about a completed transaction, such as results, confirmation, or further programmatic instructions that may be provided to another software application using appropriate APIs. That is, in some cases, the resulting transaction records may contain data outputs resulting from the processes of the transaction application. In these cases, the data within the transaction records may be stored into enterprise databases 125, or otherwise used to update data in the enterprise databases 125. In some cases, the transaction process data records may be programmatic instructions, which may be executed by downstream software applications of the enterprise.

Computing devices executing transaction applications, such as host servers 133, may transmit the results over a network 103 to the enterprise, where the data communications containing the transaction records are stored into a message queue 105. Where the transaction application is executed by a computing device of the enterprise, such as an internal host server 133*a*, the transaction records may be transmitted through an internal or private network 103 to the message queue 105. Likewise, where the transaction application is executed by a computing device external to the enterprise, such as an external host server 133*b*, the resulting transaction records may be transmitted to the message queue 105. However, in some embodiments, the computing devices external to the enterprise are not aware of the message queue 105, and are thus configured to the transmit transaction records to a public-facing destination address associated with the organization enterprise, such as a registered, published, or otherwise public-facing IP address. In these embodiments, a gateway device (not shown) of the enterprise may route data communications containing the transaction records to the message queue 105.

Vendor Data Channel and Host Systems

A vendor data channel 101*c* may comprise hardware and software devices of one or more networks 103, and vendor data systems 135 belonging to one or more vendors. In some embodiments, enterprise application servers 133*a* and/or enterprise databases 125 may consume data or instructions provided from third-party vendors. In some implementations, the vendor may offer a subscribed computing service to the enterprise where the vendor receives instructions and data records from one or more devices of the organization, executes the subscribed service using the data records, and returns the resulting data records. The results may be returned in real-time, near real-time, or as part of periodic batch transfer. Vendor computing services may include third-party plug-in services that provide members or administrators of the enterprise systems with a co-branded or seamlessly integrated service. Non-limiting examples of vendor services may include cloud-based consumer applications (e.g., Google Apps®, Microsoft Azure®), car-pricing and purchasing services (TruCar®, Vast®), indirect lending software (e.g., CreditRevue®), among others.

It should be appreciated that vendor services may be executed by other devices of the system 100, and thus transaction records associated with the vendor services may be provided to a message queue 105 through other communication channels 101. However, in such cases, data records for data used by the vendor applications may be replicated to the enterprise through the vendor data channel 101*c* on a predetermined interval. In some implementations, vendor applications may be executed on enterprise servers 133*a*, 121, 123 and as such the resulting transaction data may be transmitted through the message queue 105 through an application data channel 101*b*. In some implementations, the vendor applications may be executed by member devices 131 and transaction data may transmitted to the enterprise through a member computing contact channel 101*a*. Continuing with a previous example where the organization is a bank, and the bank offers auto loans to members (i.e., customers); a third-party vendor service may be a web-based vehicle searching and pricing application (e.g., TruCar®, Vast®). Using various APIs, the vendor's web application plugs into the organization's website to provide members with a co-branded, but integrated, car-buying service. In this example, some data may be exchanged through the vendor data channel 101*c* in real-time. Alternatively, rather than offering a cloud-based computing service, some implementations may execute the vendor transaction application on an enterprise server. In such implementations, the organization may only subscribe to the data updates for the transaction application, and thus the data records may be transmitted through the vendor data channel 101*c* at a predetermined interval (e.g., daily, weekly, monthly). For example, the car-buying transaction application may be installed and executed on an enterprise server supporting the webserver hosting the organization's website. In this example, the car data records may be replicated from the vendor systems 135, at the predetermined interval.

In some implementations, contact records and transaction records may be generated to indicate that the vendor system 135 communicated data to the enterprise over the vendor data channel. Transaction records may indicate the processes performed by the vendor computing service (e.g., application execution, data replication), and the data updates that resulted from the requested processes.

Telephony Channel and Telecommunications Network

A telephony channel 101*d* may comprise hardware and software components capable of hosting and relaying data communications transmitted to the enterprise from a member telecom device 139. In the exemplary system 100, the telephony channel 101*d* may comprise the member telecom device 139, a telephony service 137, and a telecommunications network 111. The telephony channel 101*d* may facilitate data communications that are transferred or generated according to telecommunications protocols (e.g., PSTN, POTS, 3G, 4G, EDGE, VoIP). A telephony service 137 may translate or generate data according to expected packet-switched network 103 protocols, and then transmit the data to the enterprise. Non-limiting examples of the data arriving through the telephony channel 101*d* may include: browser activity when the member device 139 is smartphone; short-message service (SMS) messages (i.e., text messages); and results from an interactive voice response (IVR), among others.

A member device 139 may be any electronic device comprising hardware and software components for telephonic telecommunication over a telecommunications network. A member device 139 may comprise non-transitory machine-readable storage media and a process capable of executing software applications, such as a web browser. Non-limiting examples of a member device 139 may include a conventional wired telephone, a cellular telephone, a smartphone, a voice-over-IP (VoIP) telephone, a softphone executed by a computing device (e.g., workstation, tablet), and the like. A member may use the member device 139 to contact an MSR, by placing a call or sending a text message over a telecommunications network 111. Additionally or alternatively, in some cases, the member may use the member device 139 to transmit data or request services to the enterprise. In these cases, the telecommunications network 111 may relay the member communication (e.g., text, call, http instructions), to a telephony system 137, which may transmit the communication to the enterprise over a packet-switched network 103.

A telephony system 137 may be a computing service executed by one or more servers having processors capable of executing the various tasks described herein. It should be appreciated that the telephony system 137 may be a component of the enterprise, but may also be a component of the telecommunications network 111. For example, in some cases, the telephony system 137 may execute an IVR service, which may present to incoming callers a series of menu options that the IVR service uses to determine the nature and purpose of the contact. The IVR system may then determine how to route the call based on the inputs received from the member device 138, and then informs the telecommunications network 111 how to appropriately route the call. The IVR system may also generate contact data, such as an IVR record, containing information about the member call and the resulting interactions. This data may be provided over a network 103 to a message queue 105.

In some embodiments, the telephony system 137 may be configured to receive and translate SMS messages from a member device 139 to a format useful for computers and capable of being transmitted over a network 103. In these embodiments, a telecommunications-based text message may be transmitted over a telecommunications network 111, but indicates that the member wants the text message to be directed to the organization. For example, a member may wish to text his or her banking organization instructions to transfer funds between accounts. The SMS message may be received at a message queue 105 through a network 103, after the SMS message was converted by the telephony system 137 to a computer legible text format (e.g., ASCII, Unicode), from the telecomm-based text format (e.g., SMS).

Data communications received through a telephony channel 101*d* may generate contact record indicating information about the member and the contact. In the event that transaction applications of the enterprise are executed, then transaction records may be generated. For example, if a member sends a text message containing a balance inquiry, then a contact record is generated, however a transaction record may or may not be generated based on the settings of the system. The member may elect not to follow up after checking his or her balance, in which case the contact record may be the only record generated. But, if the member then sends a text instructing the organization to transfer funds between accounts, then a transaction record may be generated containing data about the transaction. It should be appreciated that the balance inquiry is also a valid transaction for which a transaction record may be generated. As an example, in order for the organization to understand which communication channels 101 members use to check their account balance, transaction records may be generated for each contact that results in a balance inquiry transaction being received.

Organization Enterprise Devices

An organization enterprise may be the collection of computing components and assets of the organization. In many implementations, it may represent the logical boundaries for whether devices and users are internal or external to the organization, which is important for establishing access rights. The enterprise may comprise a message queue 105, an operational database 107, an MSR computer 113, analytics servers 121, application servers 123, 133*a*, and databases 125. In some embodiments, the enterprise may also include a telephony system 137 that provides various computing services using information originating from telecommunications sources, such as a telecommunications network 111. In some embodiments, the enterprise may comprise one or more private networks 103 for secure and private communication among devices of the organization.

Message Queue and Operational Database

A message queue 105 may be a database that receives and stores data communications transmitted through the various communication channels 101 of the system 100. The message queue may be hosted on one or more computing devices, such as a server computer or workstation computer, comprising non-transitory machine-readable storage media and a processor that is capable of executing the processes and tasks described herein. At regular interval or in response to an event, the message queue 105 may relay messages (e.g., contact data, transaction data) to an operational database 107, where the message will be stored, analyzed, and provided to various other devices of the system 100.

An operational database 107 may be a database that generates and stores contact records and transaction records, which are based on messages received through the various communication channels 101 of the system 100. Contact records may be database records that comprise data fields describing a contact event, between a member and the organization through a particular communication channel 101. Non-limiting examples of the data fields may include: a member identifier, a communication channel 101 identifier (e.g., "Internet," "mobile," "telephone," "SMS"), a member computer 131 or device 139 identifier, and a timestamp for the contact event. The contact may also include information about the origination of the contact: not limited to the source URL used to access the website, the toll free number dialed to contact the representative, an email used to link the member to a specific page in the website. Transaction records may contain data fields describing one or more transactions executed or otherwise initiated, including inquiry or non-traditional transactions like accessing advice pages or using social media communities by the member. The transaction records may comprise data indicating which processes were executed and which data was affected. In other words, the transaction records contain data indicating what a member accomplished during the course of a contact event.

Interfaces for the Communication Channels

Data communications, such as telephone calls and data messages (e.g., contact data, transaction data), may be received by the message queue 105 or operational database 107 in a format that may not comport with the formatting of the contact records and transaction records stored in the operational database 107. As such, one or more application programming interfaces (APIs) may be executed by devices of the system 100, to prepare the data for entry into the operational database 107. It should be appreciated that the APIs described herein may be executed by any number of devices of the system 100; one having ordinarily skill in the art would appreciate that execution of the APIs does not need to limited to the message queue 105 or the operational database 107. For example, the APIs may be executed by any number of devices of the system 100 that may be external to the enterprise, such as member computers 131, member or devices 139, vendor systems 135, and telephony systems 137. The APIs may be executed by the message queue 105, operational database 107, or other device in the system capable of performing the various tasks of the APIs.

Furthermore, the exemplary system 100 describes three sets of APIs being executed by the message queue 105 and operational database 107. However, it should be appreciated that computing devices of the enterprise may be configured to execute any number of the APIs. And, although the exemplary system 100 describes three APIs, it should be appreciated that the functions of the APIs may be aggregated or parsed into any number of APIs that perform the same tasks.

In some embodiments, a computing device of the system 100 may execute one or more application programming interfaces (APIs) that are configured to translate or otherwise convert (i.e., "conversion APIs") the contact data and/or the transaction data received from the communication channels 101. These conversion APIs may convert the contact data and/or the transaction data into a format that is compatible or matches the contact records and transaction records that are stored in the operational database 107.

In some embodiments, a computing device may execute a listener module, which may be a software module that is configured to monitor the message queue 105 for new incoming messages (e.g., contact data, transaction data). When the listener module detects an new message in the message queue 105, the listener module will trigger operations to convert the message into the format of the operational database 107.

A contact record may contain or cross-reference zero or more transaction records, because a contact event may not result in a transaction, or the contact event may result in multiple transactions. In some cases, the contact records and the transaction records may not be expressly linked or cross-referenced in the operational database 107. A computing device of the enterprise may execute a linking module or API that may identify data fields with overlapping values that indicate when a transaction record should be related to a contact record. Upon identifying overlapping values in predetermined data fields, the linking API may link, or otherwise cross-reference, the related records in the operational database 107. For example, contact data and transaction received from a communication channel 101 may be identified as being related when the linking API identifies overlap in one or more of the following exemplary data fields: a member identifier, a transaction timestamp, a contact event timestamp, and a communication channel 101. It should be appreciated that this exemplary list is not meant to be exclusive or obligatory; fewer, additional, or alternative data fields may be used by the linking API as criteria to determine whether a transaction record is related to a contact record. Alternatively or additionally, a unique contact identifier may be generated by the system originating the contact to the application transaction systems. The unique identifier may be used by the application transaction systems when they create the transaction records to identify to which contact they should be associated thus reducing the need for a linking module or API to identify matching fields.

MSRs and Member Information

Member service representatives (MSRs) staffing a call center of the organization, may receive calls from members, who may submit requests for services or products through the communication channels 101 or directly to the MSR, who may then enter the request into an MSR service application ("MSR application") that is executed by the MSR computer 113. In some cases, the MSR may execute a transaction on behalf of the member. The MSR application may access the operational database 107 to query the contact records and transaction records for a member, which may displayed on the MSR computer 113, in real-time. For example, an MSR on the phone with a member may wish to look at the member's transaction history, then the MSR will be able to query all of the contact events and then review the related transaction records. The MSR application may present a graphical user interface (GUI) with a section on the screen that shows recent key activity of a member, to help MSRs conduct a more meaningful conversation. For example, if a week ago the member changed their address, the MSR may be presented with some graphical identifier or text that indicates the change to the address. This allows the MSR application or the MSR themselves, to query whether an existing address on file for the member should be updated; particularly as it relates to, e.g., a homeowner's insurance policy. The system can further review recent activity to determine whether changes have been made to the homeowner policy and prompt the MSR to do a policy review (rather than have the MSR have to make that determination manually).

Because of the ways in which conventional systems gather and process data to analyze customer information, conventional systems merely provide limited insight into what other MSRs have previously done to help a member, but conventional system could not offer insight into what the member was doing on other communication channels 101. Data from the operation database 107 may be queried in real-time, as the member's transaction history is generated in real-time. In other words, the MSR application may query the operational database 107 and generate reports based on real-time data, which may provide the MSR with information to what that member's been doing recently through an internet channel 101a or a mobile telephony channel 101d.

In some embodiments, the operational database may receive contact data and transaction data from an MSR computer 113, which the MSR may input on behalf of the member during a call. For example, when the MSR identifies who the member is, using various spoken and automated authentication challenges, a contact record may be automatically or manually generated identifying that the MSR is transacting business for the caller on behalf of the member. In this example, the MSR is logging into the systems as an employee and thus triggering contact record being generated in the operational database 107, in response to that "log in." From there, all of the MSR activity is logged to the message queue 105 as transaction data, which is later stored as transaction records in the operational database 107. In some embodiments, some of the data for the contact record, such as a member ID, may be provided from a call routing and distribution system associated with the MSR call center.

Analytics, Processing, and Storage

In some cases, an enterprise may comprise hardware and software components that perform various functions, such as data analytics, software application processing, and data storage. In some implementations, a data warehouse of the enterprise ("enterprise data warehouse" 125) may contain data culled from a plurality of data sources from around the enterprise, including the operational database 107. The enterprise data warehouse 125 may be a database 125 hosted on one or more computing devices, such as servers computers, comprising non-transitory machine-readable storage media. In some cases, the enterprise data warehouse 125 stores historical data provided from the various software applications servers 133a, 123 and hardware devices of the enterprise. In some embodiments, analytics servers 125 and application servers 133a, 123 of the enterprise may query the enterprise data warehouse 125, or they may receive revised data records that are pushed from the enterprise data warehouse 125, to perform the various algorithms and software applications.

A business or marketing development application (e.g., IBM Unica®) may be a software application that may identify marketing leads from the contact and transaction records of the operational database 107. The marketing development application may be executed by any computing devices of the enterprise, such as application servers 123, comprising non-transitory machine-readable storage media and a processor capable of executing various data algorithms for analyzing the transaction records and contact records. In some cases, the overlap of the data may indicate more than the simple fact that a transaction occurred during a contact event. Instead, knowledge about the member's circumstances may be derived based upon the data within the transaction records and contact records, such that marketing leads may be developed. Conventional marketing development tools may merely cross-reference behavioral aspects of members against broad demographic grouping criteria to draw inferences about a member's particular behavior. However, conventional tools are unable to identify leads in real-time or near-real time based on a member's interactions with the system from across one or more of communication channels. As an example, a contact record may be generated when a member logs into a website, and a related transaction record is generated when the member begins an online application for an auto loan, but does not finish the application. Here, a marketing lead may be generated by the application server 123, and then entered into the operational database 107 as a related transaction record, and may generate a referral or follow up notification on an MSR computer 113, during a service call with the MSR.

In some embodiments, the system 100 can also provide data to allow the channels to customize the member experience on the member-facing channels. For example, the voice response menu of IVR channel could be tailored based on a member's recent activity. The member could be shown a list of their recent activity, shown offers based on their recent activity, or be prompted for certain actions based on their recent activity similar to the way that recent activity is provided for the MSR to tailor their conversation with the member.

Generating Records in an Operational Database

Figure 2:
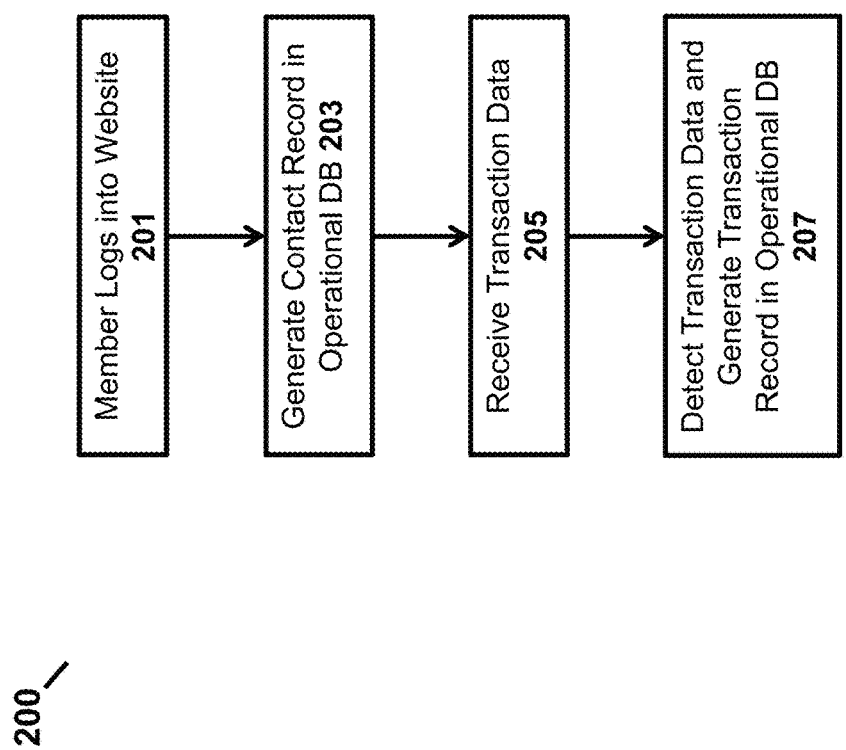
FIG. 2 shows execution of processes for generating records in an operational database from contacts across multiple channels, when data arrives through a communication channel associated with a website, according to an exemplary process.

FIG. 2 shows the execution of processes for generating records in an operational database from contacts across multiple channels, according to an exemplary process 200. The exemplary process 200 execution of generating contact records for a contact event arriving through a computing network communication channel associated with the website.

In a first step 201, a member logs into a website of the organization. That is, using a member computer, the member may provide authentication credentials, such as a member identifier or biometric input, and a password or PIN, to a webserver hosting the website. The web server may forward those credentials to an authentication server to verify the validity of the credentials. In the exemplary process 200, a user who has submitted the credentials is indeed a valid member who has submitted valid credentials.

In a next step 203, in response to the successful login, an operational database may generate a contact record that contains contact data, about the contact event (i.e., website visit). Contact data may contain information generated by any number of hardware and software devices of the system, such as the webserver, authentication server, routers, switches, firewalls, and components that generate logs containing contact data. Non-limiting examples of contact data may include: a member identifier, a device identifier, a communication channel identifier, and a timestamp, among others. In this example, the contact data may be from, e.g., log files and credentials received from the authentication server. In response to an unsuccessful login, an operational database may still generate a contact record that contains contact data and a transaction record that indicates an unsuccessful logon attempt, request for temporary password, or other request.

In a next step 205, an operational database may receive transaction history data resulting from the execution of the transaction applications. The transaction history data may indicate the various processes that were executed during the member login. For example, while logged into an authenticate website session with a banking site of the organization, the member may select on option pay a bill online. The web-application executed by the webserver may instruct a backend digital bill payment system on an application server of the enterprise, to move the funds accordingly. Then, after processing that transaction, the digital bill payment system may write transaction history data to the message queue.

In a next step 207, after generating the transaction data in the message queue, the transaction data is detected by a listener module, converted to compatible formats, and then that transaction data will be written to the operational database. The operational database may then link the newly-generated transaction record to the associated contact record, thereby cross-referencing the contact event with the bill payment that occurred during that contact.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A system comprising:
a representative computer operated by a representative at a call center and associated with a call with a user having a user identifier, the representative computer configured to query an operational database for one or more contact records and one or more transaction records associated with the user identifier, format, and display the one or more contact records and the one or more transaction records for presentation on a graphical user interface during the call with the user;
a computer having a public facing IP address, the computer configured to:
receive contact data in a first format from at least one of a plurality of first channels, the contact data comprising the user identifier and an electronic device identifier corresponding to an electronic computing device operated by the user and used to electronically contact a server of the system;
receive transaction data associated with the user identifier and the electronic device identifier during a communication between the electronic computing device and the server, wherein the transaction data comprises instructions for execution of one or more tasks;
generate the one or more transaction records corresponding to execution of at least one transaction task of the one or more tasks; and
generate the one or more contact records corresponding to execution of at least one inquiry task of the one or more tasks;
the operational database configured to:
receive and store contact data in a second format from a second channel corresponding to a web session initiated by the user; and
store the one or more contact records and the one or more transaction records received from the computer; and
an application program interface communicatively coupled to the operational database and the computer, the application program interface configured to:
in response to the computer receiving contact data in the first format, convert the contact data into a third format compatible with the contact data in the second format stored in the operational database, and
transmit the converted contact data to the operational database, whereby the operational database provides the contact data received from the second channel and the contact data received from the application program interface to the representative computer in real time upon receiving the query from the representative computer.

2. The system according to claim 1, further comprising one or more devices configured to communicate one or more messages through the plurality of first channels or the second channel, wherein the application program interface is further configured to receive, from a device configured to communicate through the at least one channel, a message containing a processing request.

3. The system according to claim 2, wherein the application program interface further generates, based on the processing request, a transaction process record associated with the one or more contact records.

4. The system according to claim 3, wherein the computer stores the transaction process record into the operational database.

5. The system according to claim 3, further comprising an application server executing a software application, wherein the processing request contains instructions for the software application received from the device through the at least one channel.

6. The system according to claim 1, wherein the contact data contains information describing the at least one channel and a device configured to communicate through the at least one channel.

7. The system according to claim 1, further comprising a message queue configured to store one or more messages received from one or more devices, wherein the message queue is hosted on non-transitory machine-readable storage memory coupled to the operational database and coupled to the computer.

8. The system according to claim 7, wherein the computer having the application program interface executes a listener module, the listener module configured to:
continuously monitor the message queue for the one or more messages received from the one or more devices, and format the contact data for storage into the operational database in response to detecting a new incoming message stored in the message queue received through a channel.

9. The method according to claim 8, wherein the listener module further generates a transaction process history record associated with at least one contact record.

10. The system according to claim 1, wherein a channel of the plurality of first channels is selected from the group consisting of:
an application data channel, an interactive voice response system channel, a short message service channel, an analytics application channel, an analytics application.

11. The system according to claim 1, further comprising a marketing lead application executed on one or more servers, the marketing lead application configured to receive a set of records from the operational database, and determine one or more products or services to offer to the user having the user identifier.

12. The system according to claim 11, wherein the one or more products or services are presented on the graphical user interface of the representative computer during the call.

13. The system according to claim 1, further comprising an enterprise data warehouse hosted on non-transitory machine-readable storage media of one or more servers, wherein the operational database is configured to replicate one or more data records to the enterprise data warehouse at a predetermined interval.

14. The system according to claim 13, further comprising one or more backend applications hosted on one or more servers, each backend application is configured to query the data records stored in the enterprise data warehouse and execute one or more analytics on the data records.

15. A system comprising:
a marketing generation application hosted on one or more servers, the marketing generation application configured to identify a product or service to offer a user based on information contained in one or more data records stored in an enterprise data warehouse hosted on one or more servers;
a representative computer operated by a representative at a call center and associated with a call with a user having a user identifier associated with the user, the representative computer configured to:
receive, from the marketing generation, application the product or service to offer the user,
receive, from an operational database, one or more contact records and one or more transaction records associated with the user, and
present the product or service on a graphical user interface displayed by the representative computer during the call with the user;
a computer having a public facing IP address, the computer configured to:
receive contact data in a first format from at least one of a plurality of first channels, the contact data comprising the user identifier and an electronic device identifier corresponding to an electronic computing device operated by the user and used to electronically contact a server of the system;
receive transaction data associated with the user identifier and the electronic device identifier during a communication between the electronic computing device and the server, wherein the transaction data comprises instructions for execution of one or more tasks;
generate the one or more transaction records corresponding to execution of at least one transaction task of the one or more tasks; and
generate the one or more contact records corresponding to execution of at least one inquiry task of the one or more tasks;
the operational database configured to:
receive and store contact data in a second format from a second channel corresponding to a web session initiated by the user; and
store the one or more contact records and the one or more transaction records received from the computer;
an application program interface communicatively in coupled to the operational database and the computer, the application program interface configured to:
in response to the computer receiving contact data in the first format, convert the contact data into a third format compatible with the contact data in the second format stored in the operational database, and
transmit the converted contact data to the operational database,
whereby the operational database provides the contact data received from the second channel and the contact data received from the application program interface to the representative computer in real time upon receiving the query from the representative computer.

16. The system according to claim 15, wherein the representative computer is further configured to query the operational database for the one or more contact records associated with the user identifier, format the one or more contact records for presentation on the graphical user interface, and present the one or more contacts records on the graphical user interface.

17. The system according to claim 15, further comprising one or more devices configured to communicate one or more messages through the plurality of first channels,
wherein the computer having the application program interface is further configured to receive, from a device configured to communicate through the at least one first channel, a message containing a processing request.

18. The system according to claim 15, wherein the application program interface further generates a transaction process record associated with the one or more contact records based on the processing request, and stores the transaction process record into the operational database.

19. The system according to claim 18, wherein at least one data record stored in the enterprise data warehouse contains the transaction process record.

20. The system according to claim 15, wherein a channel of the plurality of first channels is selected from the group consisting of:
an application data channel, an interactive voice response system channel, a short message service channel, an analytics application channel, an analytics application.

* * * * *